US011102040B2

(12) United States Patent
Pelletier et al.

(10) Patent No.: US 11,102,040 B2
(45) Date of Patent: *Aug. 24, 2021

(54) RECONFIGURATION OF ACTIVE COMPONENT CARRIER SET IN MULTI-CARRIER WIRELESS SYSTEMS RELATED APPLICATION

(71) Applicant: Optis Wireless Technology, LLC, Plano, TX (US)

(72) Inventors: Ghyslain Pelletier, Laval (CA); Lars Sundstrom, Sodra Sandby (SE)

(73) Assignee: Optis Wireless Technology, LLC, Plano, TX (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/518,848

(22) Filed: Jul. 22, 2019

(65) Prior Publication Data
US 2019/0342134 A1 Nov. 7, 2019

Related U.S. Application Data

(63) Continuation of application No. 15/816,426, filed on Nov. 17, 2017, now Pat. No. 10,411,927, which is a (Continued)

(51) Int. Cl.
*H04W 4/00* (2018.01)
*H04L 27/26* (2006.01)
(Continued)

(52) U.S. Cl.
CPC .......... *H04L 27/2605* (2013.01); *H04L 5/001* (2013.01); *H04L 5/0037* (2013.01);
(Continued)

(58) Field of Classification Search
CPC ... H04L 27/2605; H04L 5/001; H04L 5/0037; H04L 5/0053; H04L 5/0096;
(Continued)

(56) References Cited

U.S. PATENT DOCUMENTS 8,124,446 B2 2/2012 Lee et al.
8,472,363 B2 6/2013 Higuchi et al.
(Continued)

FOREIGN PATENT DOCUMENTS

EP 2 086 265 A2 8/2009
JP 9-321670 A 12/1997
(Continued)

OTHER PUBLICATIONS

IN First Examination Report with English translation dated Jan. 28, 2019 in IN application 987/KOLNP/2012.
(Continued)

*Primary Examiner* — Stephen M D Agosta
(74) *Attorney, Agent, or Firm* — Nixon & Vanderhye P.C.

(57) ABSTRACT

In a multi-carrier wireless system, potential problems from reconfiguring mobile station resources to accommodate changes in component-carrier configuration are mitigated by inserting a guard period each time the configuration of component carriers changes, so that transceiver reconfiguration can be carried out without interfering with ongoing transmission. A base station is configured to transmit data to a mobile station according to a first configuration of two or more component carriers, to determine that a change of configuration to a second component carrier configuration is required, and to signal the change of configuration to the mobile station, using the first configuration of component carriers. The base station then refrains from transmitting data to the mobile station during a pre-determined guard interval of at least one transmission-time interval subsequent to the signaling of the change of configuration. After the guard interval, data is transmitted to the mobile station according to the second component carrier configuration.

23 Claims, 5 Drawing Sheets

Related U.S. Application Data continuation of application No. 15/249,125, filed on Aug. 26, 2016, now Pat. No. 9,853,848, which is a continuation of application No. 13/498,195, filed as application No. PCT/SE2009/051484 on Dec. 22, 2009, now Pat. No. 9,462,484.

(60) Provisional application No. 61/247,086, filed on Sep. 30, 2009.

(51) Int. Cl.
  *H04W 76/28* (2018.01)
  *H04L 5/00* (2006.01)
  *H04W 24/02* (2009.01)

(52) U.S. Cl.
  CPC .......... *H04L 5/0053* (2013.01); *H04L 5/0096* (2013.01); *H04W 24/02* (2013.01); *H04W 76/28* (2018.02); *H04L 5/0064* (2013.01); *H04L 5/0087* (2013.01)

(58) Field of Classification Search
  CPC ..... H04L 5/0087; H04L 5/0055; H04L 5/005; H04L 5/0092; H04L 27/0006; H04L 5/0048; H04L 1/1887; H04L 27/2657; H04W 76/28; H04W 24/02; H04W 52/146; H04W 52/281; H04W 52/34; H04W 52/365; H04W 52/367; H04W 72/0453; H04B 7/0617; H04B 7/15542; H04J 11/0023; H04M 15/66
  See application file for complete search history.

(56) References Cited

U.S. PATENT DOCUMENTS

| | | | | |
|---|---|---|---|---|
| 8,489,105 | B2* | 7/2013 | Choi | H04W 48/08 455/452.1 |
| 8,948,110 | B2* | 2/2015 | Roessel | H04L 5/0062 370/329 |
| 9,462,484 | B2* | 10/2016 | Pelletier | H04W 76/28 |
| 9,807,747 | B2* | 10/2017 | Hsieh | H04W 72/042 |
| 9,853,848 | B2* | 12/2017 | Pelletier | H04W 24/02 |
| 10,389,422 | B2* | 8/2019 | Muruganathan | H04B 7/0617 |
| 10,411,927 | B2* | 9/2019 | Pelletier | H04W 24/02 |
| 2006/0274712 | A1 | 12/2006 | Malladi et al. | |
| 2009/0004971 | A1 | 1/2009 | Dateki et al. | |
| 2009/0047984 | A1 | 2/2009 | Gollamudi et al. | |
| 2009/0110033 | A1 | 4/2009 | Shattil | |
| 2009/0296609 | A1 | 12/2009 | Choi et al. | |
| 2009/0296833 | A1 | 12/2009 | Sawahashi | |
| 2009/0323642 | A1 | 12/2009 | Tanno et al. | |
| 2010/0232373 | A1 | 9/2010 | Nory et al. | |
| 2010/0322158 | A1* | 12/2010 | Lee | H04L 5/0092 370/329 |
| 2011/0002281 | A1 | 1/2011 | Terry et al. | |
| 2011/0026498 | A1 | 2/2011 | Zheng et al. | |
| 2011/0105136 | A1* | 5/2011 | Choi | H04W 48/08 455/452.1 |
| 2011/0110315 | A1 | 5/2011 | Chen | |
| 2011/0211630 | A1 | 9/2011 | Nakahara | |
| 2011/0292816 | A1 | 12/2011 | Lee et al. | |
| 2011/0294491 | A1 | 12/2011 | Fong et al. | |
| 2012/0076043 | A1* | 3/2012 | Nishio | H04L 1/1861 370/252 |
| 2012/0147821 | A1 | 6/2012 | Bertrand | |
| 2018/0076995 | A1 | 3/2018 | Pelletier et al. | |

FOREIGN PATENT DOCUMENTS

| | | |
|---|---|---|
| JP | 2009-1183003 A | 5/2009 |
| JP | 2009-532972 A | 9/2009 |
| WO | 00/51304 A1 | 8/2000 |
| WO | 2006/105307 A1 | 10/2006 |
| WO | 2007/024559 A1 | 3/2007 |
| WO | 2009/120123 A1 | 10/2009 |
| WO | 2010/107604 A2 | 9/2010 |

OTHER PUBLICATIONS

3rd Generation Partnership Project; Technical Specification Group Radio Access Network; Physical Layer Aspects for Evolved Universal Terrestrial Radio Access (UTRA), Release 7, 3GPP TR 25.814, V7.1.0, Sep. 2006, 132 pages.

3rd Generation Partnership Project, Technical Specification Group Radio Access Network; Evolved Universal Terrestrial Radio Access (E-UTRA); Physical Channels and Modulation, Release 8, 3GPP TS 36.211, V8.5.0, Dec. 2008, 82 pages.

3rd Generation Partnership Project, Technical Specification Group Radio Access Network; Feasibility Study for Further Advancements for E-UTRA (L TE-Advanced), Release 9, 3GPP TR 36.912, V2.1.1, Sep. 2009, 52 pages.

CATT, "Consideration on DRX," R2-092992, 3GPP TSG RAN WG2 Meeting #66, San Francisco, California, May 4-8, 2009, 2 pages.

Ericsson, et al., "Text Proposal for DC-HSDPA Assumptions and Standards Impact," R1-082249, 3GPP TSG-RAN WG1 Meeting #53, Kansas City, MO, May 5-9, 2008, 18 pages.

Ericsson, et al., "DRX with Carrier Aggregation in L TE-Advanced," R2-092959, 3GPP TSG-RAN WG2 #66, San Francisco, California, May 4-8, 2009, 3 pages.

Ericsson, et al., "Impact Analysis of Dual Cell HSU PA on RRM Requirements," R4-092347, 3GPP TSG-RAN WG4 #51, Los Angeles, California, Jun. 29-Jul. 2, 2009, 3 pages.

Ericsson, et al., "Dual Cell HSUPA RRM Requirements," R4-093053, 3GPP TSG-RAN WG4 #52, Shenzhen, China, Aug. 24-28, 2009, 3 pages.

International Search Report and Written Opinion received in Patent Cooperation Treaty Application No. PCT/SE2009/051484, dated May 6, 2010, 12 pages.

LG Electronics Inc., "System Information for Carrier Aggregation," R2-093845, 3GPP TSG-RAN2 Meeting #66bis, Los Angeles, California, Jun. 29-Jul. 3, 2009, 2 pages.

MediaTek, "DRX Operation in Carrier Aggregation Mode for LTE-A," R2-094258, 3GPP TSG RAN WG2 Meeting #67, Shenzhen, China, Aug. 24-28, 2009, 2 pages.

Texas Instructions, "Issues on Carrier Aggregation for Advanced E-UTRA," R1-084443, 3GPP TSG RAN WG1 #55, Prague, Czech Republic, Nov. 10-14, 2008, 5 pages.

* cited by examiner

*FIG. 5*

RECONFIGURATION OF ACTIVE COMPONENT CARRIER SET IN MULTI-CARRIER WIRELESS SYSTEMS RELATED APPLICATION

RELATED APPLICATION

This application is a continuation application of U.S. application Ser. No. 15/816,426, filed Nov. 17, 2017, which is a continuation application of U.S. application Ser. No. 15/249,125, filed Aug. 26, 2016, now U.S. Pat. No. 9,853,848, which is a continuation of U.S. application Ser. No. 13/498,195 filed Mar. 26, 2012, now U.S. Pat. No. 9,462,484, which is a U.S. national stage application under 35 U.S.C. § 371 of International Patent Application No. PCT/SE09/51484 filed Dec. 22, 2009, which claims priority to U.S. application Ser. No. 61/247,086 filed Sep. 30, 2009.

TECHNICAL FIELD

The present invention is related to wireless communications systems, and in particular is related to the operation of mobile stations and base stations in a multi-carrier wireless system, in which data can be transmitted to or from a mobile station using two or more distinct, separately modulated, carrier frequencies.

BACKGROUND

Forthcoming cellular system standards, such as the so-called "Long-Term Evolution" (LTE) systems developed by participants in the 3<rd>-Generation Partnership Project (3GPP), will provide a much larger degree of flexibility than currently operating wireless networks. In particular, systems deployed according to Release 10 of the 3GPP LTE specifications will be better able than existing systems to exploit the full potential of the new technologies introduced in LTE, both in terms of system and per-user throughput, and will be better suited for co-existence and deployment in legacy bands.

A mobile station (a user equipment, or UE, in 3GPP terminology) designed for such future standards will generally be required to support a wide range of bandwidths, in many cases aggregated within or over multiple bands. Carrier aggregation, in which two or more separately modulated carrier signals in distinct frequency bands are simultaneously used to carry uplink or downlink traffic for a given mobile station, may be viewed as a scheme for providing flexible bandwidth configuration on a sub-frame basis. With this dynamic re-allocation of potentially large chunks of bandwidth, future systems will be able to quickly respond to users' varying needs for data transmission throughput.

In such a multi-carrier system, such as for an LTE release-10 connection between a network and mobile station, there will be an active set of carriers that are available for carrying traffic for that mobile; these carriers are referred to as component carriers. The mobile station will not be required to continuously receive and transmit on all component carriers in the active set—a given component carrier needs to be processed by the mobile station's receiver or transmitter only if there is a data transmission assignment or grant for that component carrier.

Generally, multiple component carriers need to be simultaneously used for a given mobile station only if those data transmissions are frequent and large enough. As a result, discontinuous-reception (DRX) and discontinuous-transmission (DTX) mechanisms will be used to allow the mobile station to power down parts of the receiver and transmitter during times when no data needs to be received or transmitted on one or more of the component carriers in the active set—this approach allows for a dramatic reduction in power consumption when data throughput requirements are very low or moderate, compared to the power consumed during maximum throughput scenarios, i.e., when all of two or more available component carriers are fully utilized. Indeed, the use of such schemes is generally considered to be a prerequisite to obtain an acceptable level of power consumption in multi-carrier-capable mobile stations.

In the standardization of multi-carrier operation in LTE release 10, the exact operation of DRX and DTX has not yet been specified. In particular, issues regarding whether and how DRX and DTX for one component carrier will relate to DRX and DTX for other component carriers has not been resolved. One possibility is that all component carriers always follow the same DRX/DTX cycle. An alternative approach that provides a greater degree of flexibility is to permit each component carrier to have its own independent DRX/DTX cycle.

SUMMARY

In a multi-carrier system, discontinuous receive (DRX) and discontinuous transmit (DTX) processes need to be predictable well in advance of changes in component carrier configuration, to allow for careful scheduling of power-down, power-up and/or reconfiguration of transceiver components. This careful scheduling is necessary to avoid interfering with the ongoing reception and transmission. This scheduling is particularly complicated in multi-carrier systems because the number and/or identities of component carriers scheduled for a given interval may vary from one sub-frame to the next, often in ways that are unpredictable.

Accordingly, in various embodiments of the present invention, potential problems from reconfiguring mobile station resources to accommodate changes in component-carrier configuration are mitigated by inserting a guard period each time the configuration of component carriers changes due to an inter-component-carrier assignment, so that power-up/down and/or radio reconfiguration can be carried out without interfering with ongoing transmission. In other words, a guard period corresponding to at least one subframe is inserted prior to configuration changes to allow for power-up, power-down, and/or radio reconfiguration events. It is readily understood that the duration of this guard period could be one or several transmission time intervals.

Embodiments of the present invention comprise base stations and mobile stations, each configured to exploit a guard interval accompanying changes of component-carrier configuration. Corresponding methods for operating a base station and a mobile station are also disclosed. For example, an exemplary base station according to some embodiments of the invention comprises a control circuit configured to transmit first data to a mobile station according to a first configuration of two or more component carriers, to determine that a change of configuration to a second component-carrier configuration is required, and to signal the change of configuration to the mobile station, using the first configuration of component carriers. The control circuit is further configured to then refrain from transmitting data to the mobile station during a pre-determined guard interval of at least one transmission-time interval subsequent to the signaling of the change of configuration. After the guard interval, the control circuit then transmits second data to the mobile station according to the second component-carrier configuration.

In some embodiments, the pre-determined guard interval consists of a single transmission-time interval, such as an LTE subframe, although other guard interval lengths are possible. The precise timing of the guard interval may also vary, depending on the embodiment—in some embodiments, the pre-determined guard interval immediately follows the transmission-time interval in which the change of configuration is signaled, while in others, the guard interval is delayed by one or more transmission-time intervals following the transmission-time interval in which the change of configuration is signaled. In the latter case, the base station may continue transmitting the first data according to the first configuration for at least one transmission-time interval subsequent to the signaling of the change of configuration and prior to the pre-determined guard interval.

Several different changes to component-carrier configuration may trigger the operations summarized above. For instance, in some embodiments the triggering change in configuration may be limited to a change in the number of component carriers to be used for data transmission, while in other embodiments, any change to the set of active component carriers may trigger the use of a guard interval, including those changes where the number of active component carriers remains the same.

Because the scheduling of the guard interval may coincide with one or more previously scheduled processes from time to time, the base station may be further configured to automatically adjust those processes to accommodate the guard interval, or to mitigate the guard interval's effect. For instance, in some embodiments, the base station may be further configured to delay an automatic-repeat-request process corresponding to the mobile station by a number of transmission-time intervals equal to the pre-determined guard interval.

An exemplary wireless mobile station configured for multi-carrier operation according to the techniques disclosed herein comprises a control circuit configured to receive first data from a base station according to a first configuration of two or more component carriers and to receive signaling information indicating that a change of configuration to a second component-carrier configuration is pending. In response to the signaling information, the wireless mobile station selectively activates de-activates or reconfigures one or more transceiver components during a pre-determined guard interval of at least one transmission-time interval, and then receives second data from the base station according to the second component-carrier configuration, after the expiry of the guard interval.

Again, the pre-determined guard interval may consist of a single transmission-time interval, in some embodiments, although other guard intervals are possible. Likewise, while in some embodiments the pre-determined guard interval immediately follows the transmission-time interval in which the signaling information is received, in other embodiments the guard interval is instead delayed by one or more transmission-time intervals following the transmission-time interval in which the change of configuration is signaled; in these latter embodiments the mobile station may continue receiving the first data according to the first configuration for at least one transmission-time interval subsequent to receiving the signaling information and prior to the pre-determined guard interval.

As was the case with the base station discussed above, a wireless mobile station configured according to the present invention may be further configured to adjust one or more already scheduled processes to accommodate the guard interval accompanying a component-carrier configuration change. For instance, in some embodiments the mobile station is further configured to delay an automatic-repeat-request process corresponding to the mobile station by a number of transmission-time intervals equal to the pre-determined guard interval. In these and other embodiments, the mobile station may be further configured to determine that an outgoing data transmission is scheduled for the guard interval and to defer the data transmission until after the pre-determined guard interval. In some embodiments, this deferral of the data transmission until after the pre-determined guard interval may comprise performing a HARQ retransmission of the outgoing data transmission.

Methods corresponding to the various base station and mobile stations embodiments summarized above are also disclosed. Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

The introduction to wireless systems of carrier aggregation, i.e., multi-carrier operation, calls for mobile stations having the flexibility to reconfigure their radio transceiver resources depending on which component carriers (CC) are active (i.e., actually or potentially carrying control and/or traffic data for that mobile station) at a given point in time. A brute-force transceiver design might have multiple and independent transceiver entities, e.g., one for each carrier or perhaps one for each set of contiguous carriers. More elaborate receiver and transmitter architectures that are specifically tailored for carrier aggregation may be unable to reconfigure on a per-CC basis, because some transceiver parts are shared for the processing of several carriers. However, still more sophisticated designs may allow the selective activation, deactivation, or reconfiguration of various receiver and/or transmitter components in response to dynamic changes in the configuration of component carriers, to minimize power consumption.

A potential problem with multi-carrier receiver/transmitter designs stems from the fact that events such as power-up, power-down, or reconfiguration of some blocks of a transceiver may not be acceptable while data is being received or transmitted on any carrier. Such events, even if they are carried out with respect to blocks that are not currently being used for transmission and/or reception, may nevertheless interfere with the operation of active blocks.

One reason for this is that such events can generate transient responses (voltage and current spikes, voltage offsets, etc.) that may be coupled to devices and nodes of active blocks through various means, including, but not limited to, voltage/current supply wires and traces, capacitive and inductive coupling, substrate coupling, and thermal coupling. Coupling of these transient responses to active functional blocks of the transceiver may interfere with ongoing transmission and reception. This interference may be direct, e.g., via coupling to nodes and devices operating on the desired signals, or indirect, e.g., via coupling to nodes and devices that control the behavior (gain, transfer function, oscillation frequency etc.) of active functional blocks, or both.

If all scheduling of component carriers is known sufficiently in advance of any changes in component-carrier configuration, this problem can be reduced by simply activating, de-activating, or re-configuring transceiver components ahead of time, during an interval in which no data is being received or transmitted. However, the allocation of component carriers in multi-carrier systems may not be that predictable. For example, in LTE standardization discussions it has been proposed that a first downlink component carrier can contain an assignment, for a given mobile station, referring to a second component carrier that was previously not being used to carry data for the mobile station. This results in a change of component-carrier configuration that cannot be predicted ahead of time such that power up/down and/or radio reconfiguration can be scheduled without interfering with ongoing transmission.

The discussion that follows is based generally on terminology and operation of 3GPP LTE systems, and in particular discusses aspects of 3GPP LTE release 10. However, those skilled in the art will appreciate that the inventive techniques described herein are by no means limited to LTE systems or to 3GPP-specified systems. Rather, the inventive techniques described below may be applied to any system supporting a carrier aggregation scenario where a varying number of component carriers are received and/or transmitted more-or-less discontinuously.

In the time domain, a component carrier transmission may be divided into subframes, where a subframe represents the largest entity in time that cannot generally be broken into smaller discontinuous pieces of transmission (unless, perhaps, only control data is sent). In LTE, the sub-frames consists of a number of contiguous Orthogonal Frequency-Division Multiplexing (OFDM) symbols. Between any two contiguous OFDM symbols or sub-frames there is no explicit guard period allowing for a change of transceiver operation mode. There is, however, a so-called cyclic prefix (CP) at the beginning of every OFDM symbol to reduce channel-induced inter-symbol interference. Depending on the actual implementation of a transceiver, it is conceivable that all or part of the CP could be used for reconfiguration or power up/down of individual blocks, so that reconfiguration of the transceiver to accommodate changes in component-carrier configuration can be carried out without impairing the transceiver's performance. Unfortunately, in most cases the CP is orders of magnitude shorter than would be needed for this purpose (typically some 5 us in LTE). As a result, this approach is simply not practical.

A mobile station transceiver configured according to some embodiments of the present invention supports carrier aggregation for the uplink (TX), downlink (RX), or both. To fully exploit the potential for reduced power consumption made possible by the techniques discussed below, the transceiver should have one or more components or functional blocks that can be selectively activated, de-activated, or reconfigured, depending on how many and/or which component carriers are being processed. Some such transceivers may be divided into a number of distinct transmitter and/or receiver units where each such unit is used to process at least one component carrier (CC). Alternative or additionally, a mobile station transceiver may have units (e.g., individual components or groups of components acting as a functional block) that can be reconfigured to handle varying numbers of component carriers, with varying power consumption. These units may be any sort of block or combination of blocks typically found in a transceiver, including amplifiers, filters, mixers, ADCs, DACs, PLLs, digital circuitry, etc. The purpose of introducing this partitioning or flexibility is to allow for a more power efficient operation of the transceiver as the number of CCs and their properties change.

Generally speaking, the basic building blocks of receivers and transmitters differ with respect to the time it takes to change the mode of operation, e.g., the time it takes to power-up, power-down, or reconfigure a block. Typically, the phase-locked loop (PLL) circuits responsible for synthesizing local oscillator signals used for frequency translation are the circuits that take the longest time to start-up or reconfigure—this time may be on the order of some 100 microseconds from cold start to stable output. Filters, on the other hand, naturally have associated time constants related to the bandwidth of the filters, but these time constants are typically much smaller than those associated with a PLL circuit. Other blocks like amplifiers, mixers, etc., may have no intrinsic time constant of significance, at least not with respect to their signal paths. Nevertheless, even these blocks may need a substantial amount of time to reach stable operation simply because there are time constants associated with power supply, biasing, and decoupling networks. Some blocks may, however, have a change of mode of operation duration that is of no practical importance, e.g., digital circuitry and switching of signals.

Discontinuous receive (DRX) and discontinuous transmit (DTX) mechanisms are generally well known, and serve as the basis to enable regularly turning off the receiver and transmitter, respectively, or parts thereof, when the data throughput is small or zero. While it is straightforward to schedule power-up and power-down events for the single-carrier case based on the known DRX/DTX cycles for the single carrier, the situation becomes more complicated for a transceiver supporting carrier aggregation. In this latter case, power-up and power-down of any block may need to be scheduled not only based on the carrier to be processed but also with respect to the activity of all other carriers, for the reasons discussed above.

In some cases, the discussion that follows will be limited, for the sake of clarity, to DRX cycles and to a mobile station's receiver(s). However, those skilled in the art will appreciate that corresponding scenarios and proposed procedures can be applied to DTX and the mobile station's transmitter side instead, or to the combined operation of receivers and transmitters.

Figure 1:
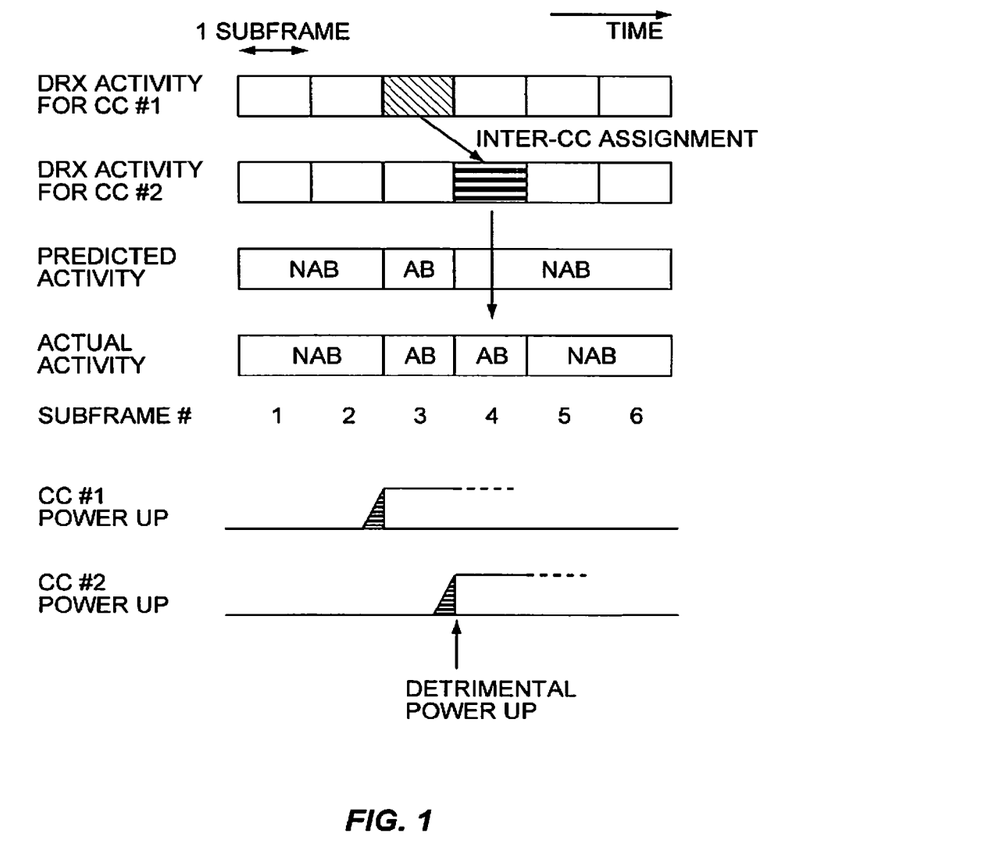
FIG. 1 is a timing diagram illustrating effects of a component-carrier configuration change on a wireless receiver.

FIG. 1 illustrates a scenario including two receive CCs, i.e., two downlink component carriers in the mobile station's active set of component carriers. At the beginning of the time frame illustrated in FIG. 1, there is no data for transmission, and thus both component carriers are inactive. However, CC#1 has a predictable active period on subframe 3 (e.g., according to a periodic DRX cycle), and therefore the required parts of the transceiver can be powered-up and configured for reception of CC#1 well ahead of time, say in subframe 2. Thus, the activation of transceiver components to handle the reception of CC#1 in subframe 3 doesn't interfere with the transmission in any way.

Given such predictability of downlink transmissions, active blocks (AB) and non-active blocks (NAB) in time can be defined, where each AB defines a period in time where no detrimental power up/down and/or radio configuration should take place. Thus, power-up/down and radio configuration should preferably be scheduled only in non-active blocks (NABS).

But in the pictured scenario, the downlink in subframe 3 of CC#1 contains an inter-CC assignment referring to CC#2 in the next subframe. In other words, the mobile station learns during subframe 3 that it must be prepared to receive CC#2 by the start of subframe 4. If portions of the transceiver have previously been de-activated, this inter-CC assignment may require a power-up and/or reconfiguration of parts of the transceiver to accommodate the reception of CC #2. However, since this requirement could not have been predicted ahead of time, there is no NAB where it can take place without potentially interfering with the ongoing reception. This is seen in the figure, which indicates when the transceiver blocks associated with CC#1 and CC#2, respectively, can be powered up. Because the power-up of blocks associated with receiving CC#2 can only be powered up during subframe 3, this power-up activity is potentially detrimental to the ongoing reception of data from CC#1.

To avoid this problem, a new technique for handling component carrier (CC) set reconfiguration is disclosed herein. According to several embodiments of the invention, the mobile station and the base station (evolved node B, or eNodeB, in 3GPP terminology) are each configured according to the following rule: if signaling in subframe k indicates a subsequent change in component-carrier configuration, relative to the status at subframe k, then at least one subsequent subframe (e.g., subframe k+1 to subframe k+x, where x>0) should not be used for any signaling or traffic data for or from that mobile station. In other words, a guard interval of at least one subframe (or other transmission-time interval) is inserted between the indication of a change in configuration and the initiation of signaling or data transmission according to that new configuration.

Figure 2:
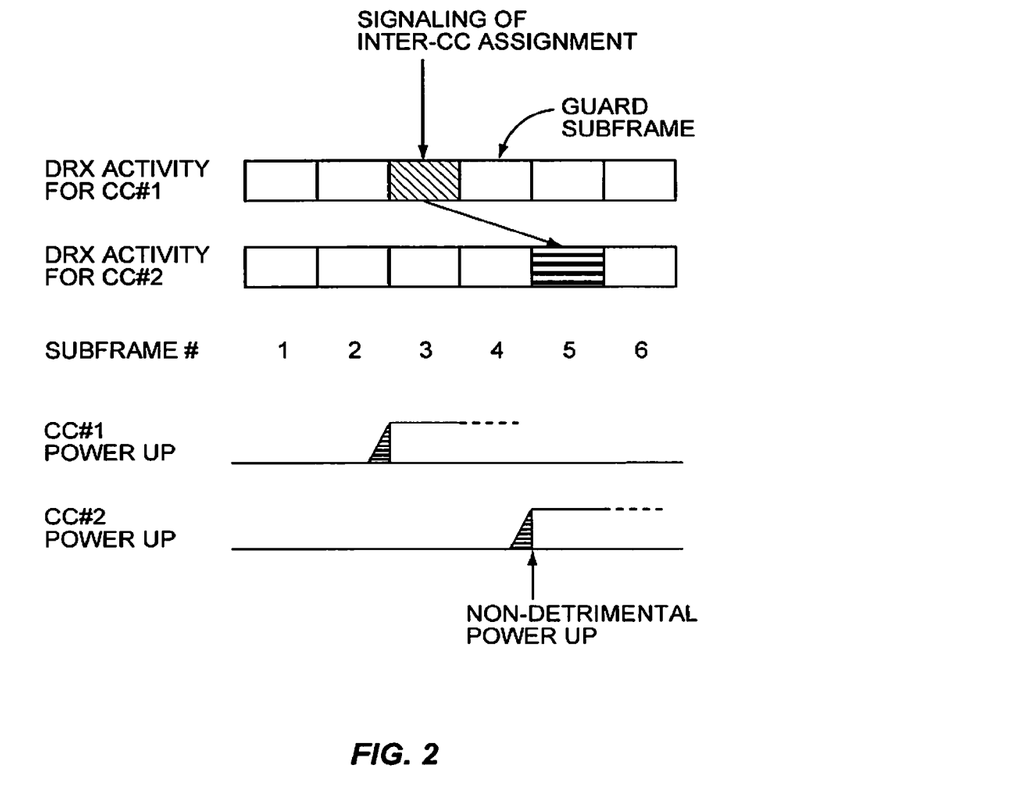
FIG. 2 is another timing diagram illustrating the use of a guard interval according to some embodiments of the present invention.

FIG. 2 illustrates an inter-component-carrier assignment where the base station performs scheduling according to one embodiment of this approach. As was the case in FIG. 1, signaling received via CC #1 at subframe 3 indicates that the mobile station should activate component carrier #2, to receive traffic data or to monitor control channel signaling, or both. However, unlike the scenario illustrated in FIG. 1, a guard interval of one subframe is inserted first (at subframe 4), so that component carrier #2 becomes active beginning at subframe 5. This provides an opportunity to power-up any necessary receiver circuitry (or re-configure active circuitry) during subframe 4, such that the power-up does not interfere with data reception on any of the active channels.

As suggested above, the guard interval may be one or several subframes (or other transmission-time interval, in systems other than LTE). Further, although the guard interval is shown in FIG. 2 as immediately succeeding the interval in which the configuration change is signalled, the guard interval could be delayed by one or more subframes in some embodiments.

Since the eNodeB in an LTE system controls the scheduling of data transmissions, those skilled in the art will appreciate that in some embodiments it may be sufficient that the eNodeB is configured according to the appropriate "rule" for inserting guard intervals, with the mobile station simply activating or de-activating component carriers as it receives scheduling information. In other embodiments, however, mobile stations may be specifically configured to follow the same rule, to maintain synchronization with the base station.

In some embodiments, the DRX (or DTX) procedure is configured so that a guard interval is inserted for any change in component-carrier configuration, including those changes where the active set of component carriers remains the same size. In other embodiments, dynamic component-carrier-configuration changes may be limited to a change in the number of component carriers that are used from one period to another, such as from a single component carrier to two component carriers, and back again. In some embodiments, then, a guard interval may be inserted in response to an indication that the number of component carriers to be used in a subsequent subframe is changing. In other embodiments, a more generalized technique may be used that takes into account that the number of component carriers may remain the same while the set of active component carriers changes.

Embodiments of the invention thus include a base station (e.g., an LTE eNodeB) configured to selectively transmit control data and/or traffic data to a given mobile station over one or several of two or more component carriers. Some embodiments may also (or instead) be configured to receive data and/or traffic data from a given mobile station over one or several of two or more component carriers. In either case, the configuration of active component carriers (i.e., component carriers that may carry control data or traffic data, or both, from or to the mobile station) may change on a fast basis (e.g., via PDCCH signaling in an LTE system). A functional block diagram of one such embodiment is pictured in FIG. 3, which illustrates an eNodeB 310, comprising radio circuits 312 and signal processing and control circuits 314, which in turn include a scheduler 316 for planning and coordinating uplink and downlink transmissions between the eNodeB 310 and one or more mobile stations (including UE 320, in FIG. 3.)

Figure 4:
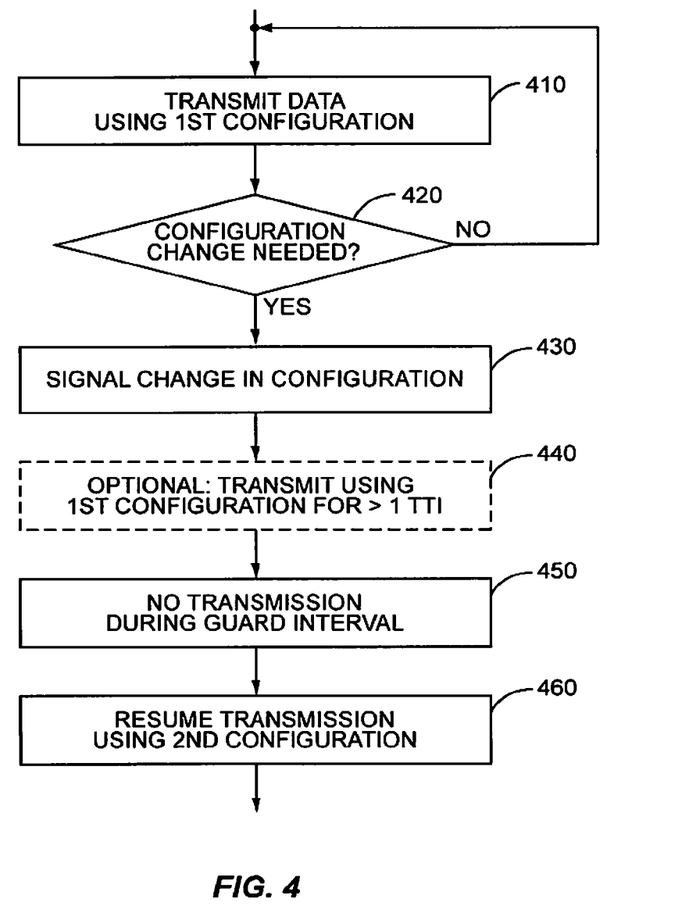
FIG. 4 is a process flow diagram illustrating an exemplary method for controlling data transmission in a multi-carrier wireless network.

To facilitate the use of at least partly independent DRX (and/or DTX) state machines for each component carrier, a base station according to some embodiments of the present invention is further configured to carry out the process illustrated generally in FIG. 4. Thus, as shown at block 410, the base station is configured to transmit control data and/or traffic data to the mobile station according to a first component-carrier configuration. After determining that a component-carrier-configuration change is needed, as indicated at block 420, the base station signals the required configuration change to the mobile station, as illustrated at block 430. Of course, the change in configuration has not yet occurred, so this signaling is carried out using the first component-carrier configuration.

As discussed above, the change in component-carrier configuration may be delayed by several transmission-time intervals, in some embodiments. Thus, in some embodiments, data may continue to be transmitted according to the first component-carrier configuration for one or more transmission-time intervals following the signaling of a configuration change, as illustrated in FIG. 440.

In any case, however, a pre-determined guard interval of at least one transmission-time interval is introduced at some point after the signaling of a configuration change, during which guard interval the base station refrains from transmitting data. This is illustrated at block 450 of FIG. 4. As discussed at length above, this allows the mobile station adequate time to reconfigure its transceiver resources to eliminate or mitigate adverse consequences that might otherwise result from the powering-up, powering-down, or reconfiguring of radio resources while simultaneously receiving data. After the guard interval has expired, transmission of control data and/or traffic data according to the changed component carrier configuration resumes, as shown at block 460.

Other embodiments of the invention include a mobile station configured to selectively receive control data and/or traffic data from a base station over one or several of two or more component carriers. Some embodiments may also (or instead) be configured to transmit data and/or traffic data over one or several of two or more component carriers. In either case, the configuration of active component carriers (i.e., component carriers that may carry control data or traffic data, or both, from or to the mobile station) may change on a fast basis (e.g., via PDCCH signaling in an LTE system). Referring back to FIG. 3, a functional block diagram of one such exemplary mobile station configured according to the inventive techniques disclosed herein is pictured. The illustrated mobile station comprises radio circuits 322 and baseband processing and control circuits 324, which in turn include a DRX/DTX controller 326, which handles, among other things, the scheduling and controlling of radio resources according to scheduling information received from eNodeB 310. Thus, DRX/DTX controller 326 generates control signals that activate, de-activate, and/or re-configure portions of the radio circuits 322 as needed, depending upon downlink/uplink resource grants, active DRX/DTX cycles, and the current component-carrier configuration.

Figure 5:
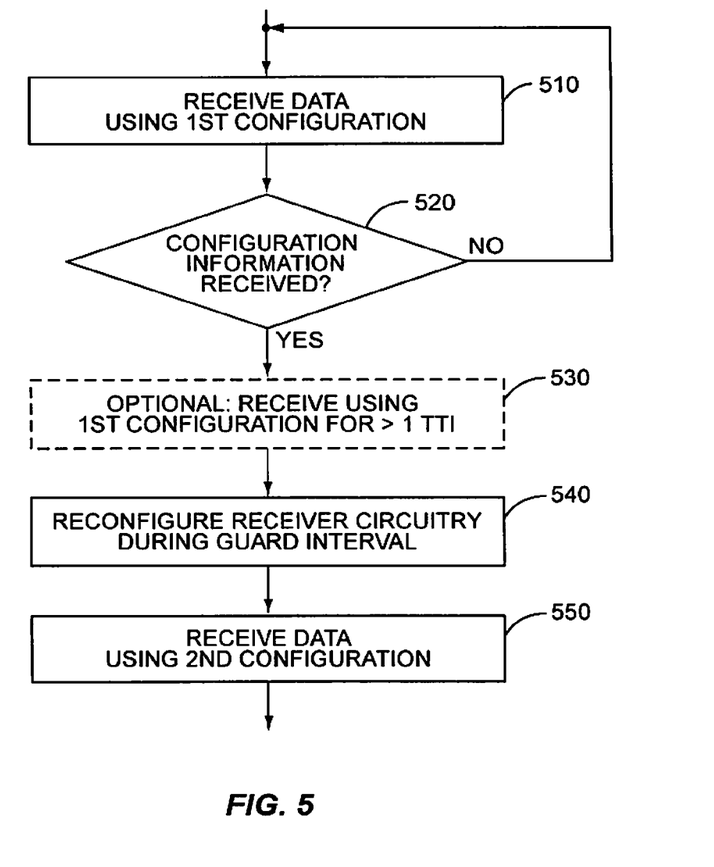
FIG. 5 is a process flow diagram illustrating a corresponding method for controlling receiver operation in a multi-carrier wireless network.

To facilitate the use of at least partly independent DRX (and/or DTX) state machines for each component carrier, a mobile station according to various embodiments of the present invention is further configured to carry out the method illustrated generally in FIG. 5. Thus, as shown at block 510, the mobile station first receives control data and/or traffic data from the base station according to a first component-carrier configuration. At some point, the mobile station receives signaling information indicating that a component-carrier-configuration change is pending, as indicated at block 520.

As discussed above in connection with FIG. 4, the actual configuration change indicated may be deferred by one or more transmission-time intervals following the signaling of the change—the length of this deferral may be pre-determined, in some embodiments, or included in the signaling information, in others. Accordingly, in some embodiments of the invention, the mobile station may continue to receive data transmitted according to the first component-carrier configuration for one or more transmission time intervals following the signaling of a configuration change, as shown at block 530. Whether immediately after the signaling, or several transmission-time-intervals later, however, a pre-determined guard interval is scheduled in response to the signaling information. During this guard interval, the mobile station's control circuitry (e.g., the DRX/DTX controller 326 of FIG. 3) selectively activates, deactivates, and/or reconfigures one or more receiver circuits, as shown at block 540. The particular receiver circuits that are activated, de-activated, or re-configured are selected based on the component-carrier-configuration change; thus the signaling information is used to determine which receiver circuits are affected. Finally, after expiry of the guard interval, reception of control data and/or traffic data is resumed, but according to the changed component-carrier configuration. This is illustrated at block 550.

Those skilled in the art will appreciate that insertion of a guard interval according to the techniques described above may have an impact on automatic-repeat-request (ARQ) processes, especially synchronous processes. There are several ways to handle this. One approach is to simply shift any required or expected ACK/NACK or scheduled uplink transmission in time, e.g., by a number of sub-frames equal to the length of the guard interval. Another approach is to handle scheduled uplink transmissions and/or ARQ feedback in a way similar to that currently specified in LTE standards for measurement gaps. In particular, 3GPP TS 36.321 specifies that conflicts between scheduled uplink transmissions and measurement gaps are handled as follows:

When a configured uplink grant is indicated during a measurement gap and indicates an UL-SCH transmission during a measurement gap, the UE processes the grant but does not transmit on UL-SCH.

[ . . . ]

NOTE: When no UL-SCH transmission can be made due to the occurrence of a measurement gap, no HARQ feedback can be received and a non-adaptive retransmission follows.

In other words, the UL-SCH transmission is cancelled, but the corresponding HARQ (Hybrid-ARQ) process will perform a non-adaptive HARQ retransmission at the next HARQ round-trip-time (RTT). The same procedure can be adapted to accommodate conflicts between scheduled uplink transmissions and guard intervals in various embodiments of the present invention.

Similarly, conflicts between measurement gaps and HARQ feedback are handled in TS 36.321 as follows:

if there is a measurement gap at the time of the HARQ feedback reception for this transmission and if the MAC PDU was not obtained from the Msg3 buffer: -set HARQ_FEEDBACK to ACK at the time of the HARQ feedback reception for this transmission.

In other words, the HARQ process is suspended if the HARQ feedback cannot be received.

Again, the same procedure can be adapted to accommodate conflicts between HARQ feedback (or other ARQ or error detection/correction feedback) in various embodiments of the invention. For example, control circuits in any of the base stations and/or mobile stations described above may be further configured to automatically delay an automatic-repeat-request process that is affected by a configuration change by a number of transmission-time intervals equal to the pre-determined guard interval. Thus, for example, if a base station would normally have expected a HARQ retransmission at subframe 5, but that subframe is now pre-empted by a guard interval of one subframe, the base station may be configured to adjust the corresponding HARQ process to anticipate the retransmission at subframe 6 instead. In some embodiments, all pending HARQ processes for a given mobile station may be delayed by an interval equal to the guard interval length.

Similar adjustments may be carried out at the mobile station. For instance, some embodiments of the mobile stations discussed above may be configured to automatically delay one or more automatic-repeat-request processes by a number of transmission-time intervals equal to the pre-determined guard interval, in response to a configuration change. In some embodiments, the mobile station's control circuitry may be more generally configured to determine that an outgoing data transmission is scheduled for the guard interval and to defer the data transmission until after the pre-determined guard interval. In some cases, this may simply mean delaying scheduled data transmissions. In other cases, the mobile station may be configured to behave as if it had actually transmitted the scheduled data at the guard interval. Because no data was actually sent, the mobile station will subsequently receive a NACK (or may assume that one is received), invoking normal HARQ retransmission procedures. Thus, in some embodiments, the deferral of data transmission until after the pre-determined guard interval effectively comprises performing a HARQ retransmission of the outgoing data transmission, where the HARQ retransmission is in fact the first transmission of the data.

Figure 3:
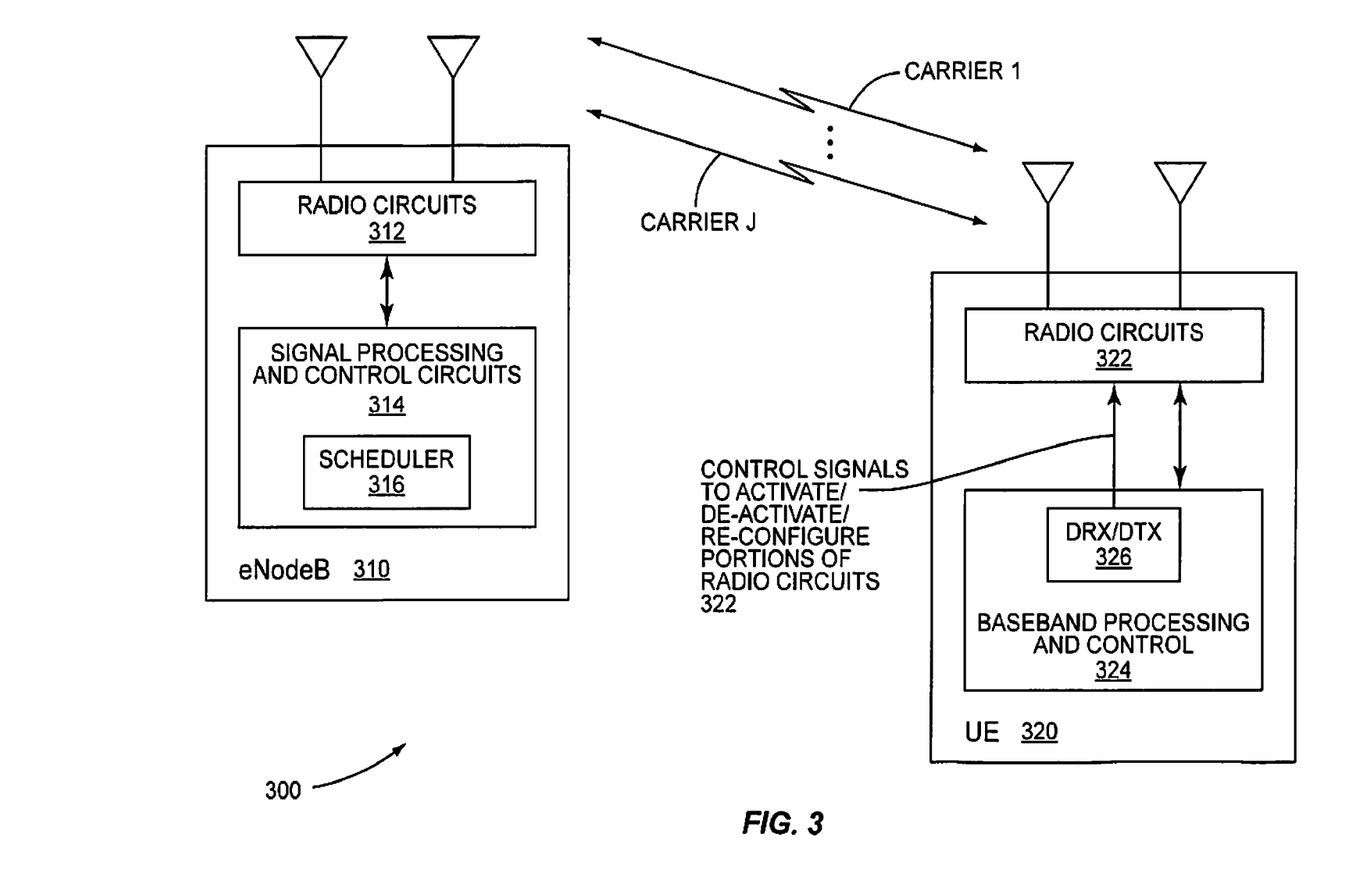
FIG. 3 illustrates functional elements of an exemplary base station and an exemplary wireless receiver.

Referring once more to the illustration of a wireless system 300 in FIG. 3, those skilled in the art will appreciate that only simplified block diagrams of eNodeB 310 and mobile station 320 are provided, as those skilled in the art are familiar with the detailed construction of these nodes and those details are unnecessary to a complete understanding of the present invention. While the details of an eNodeB 310 constructed according to the current invention will vary, those skilled in the art will appreciate that an eNodeB 310 configured to carry out one or more of the scheduling techniques described herein may comprise the basic elements pictured in FIG. 3, including radio circuits 312, configured according to the LTE specifications to communicate with one or more mobile stations, including mobile station 320, and signal processing and control circuits 314, again configured according to LTE specifications for communicating with mobile stations and the supporting 3GPP network. Signal processing & control circuits 314 comprises a scheduler function 316, configured according to one or more of the techniques described above for scheduling uplink and/or downlink transmissions on the multiple carriers (carriers 1 to J) available. Those skilled in the art will further appreciate that signal processing & control circuits 314 and scheduler function 316 may be implemented using one or several microprocessors, digital signal processors, special-purpose digital hardware, and the like, configured with appropriate software (stored in one or more memory devices, not shown) and/or firmware, as necessary, to carry out LTE communication protocols and the one or more of the particular scheduling techniques described above.

Likewise, those skilled in the art will appreciate that the details of a mobile station 320 will vary, but that a mobile station 320 configured to carry out one or more of the techniques described herein may comprise the basic elements pictured in FIG. 3, including radio circuits 322, configured according to the LTE specifications to communicate with one or more eNodeBs, such as eNodeB 310. Mobile station 320 further comprises baseband processing and control circuits 324, again configured according to LTE specifications for operating within an LTE system and the supporting 3GPP network. Baseband processing & control circuits 324 comprise a DRX/DTX control function 326, configured according to one or more of the techniques described above. In particular, DRX/DTX function 326 generates control signals to activate, deactivate, and/or reconfigure portions of radio circuits 322, depending on scheduling information received from eNodeB 310 and in accordance with pre-determined scheduling rules that provide for the use of guard periods to prevent or reduce the need for radio configuration changes during subframes in which receive or transmit functions are active.

Once more, those skilled in the art will appreciate that baseband processing & control circuits 324 and DRX/DTX control function 326 may be implemented using one or several microprocessors, digital signal processors, special-purpose digital hardware, and the like, configured with appropriate software (stored in one or more memory devices, not shown) and/or firmware, as necessary, to carry out LTE communication protocols and one or more of the DRX/DTX techniques described herein.

Of course, the preceding descriptions of various techniques for implementing DRX/DTX and other transceiver resource management functionality in a multi-carrier environment are given for purposes of illustration and example, and those skilled in the art will appreciate that the methods, apparatus, and systems described above can be readily adapted for other systems than those specifically described herein. Those skilled in the art will also appreciate, of course, that the present invention may be carried out in other ways than those specifically set forth herein without departing from essential characteristics of the invention. Accordingly, the exemplary embodiments presented herein are thus to be considered in all respects as illustrative and not restrictive.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. An apparatus, comprising:
a transceiver;
at least one processor communicatively coupled with the transceiver and configured to
receive, by the transceiver, using a first component-carrier configuration, first data, the first data comprising Physical Downlink Control Channel (PDCCH) signaling;
determine that the PDCCH signaling indicates that a change of configuration to a second component-carrier configuration is pending;
in response to the determination that the PDCCH signaling indicates that the change of configuration to the second component-carrier configuration is pending, selectively activate, de-activate, or reconfigure one or more components comprised by the transceiver, such that the transceiver is reconfigured to the second component-carrier configuration within a pre-determined guard interval of at least one transmission-time interval; and
receive, by the transceiver, second data according to the second component-carrier configuration, after the guard interval.

2. The apparatus of claim 1, wherein the pre-determined guard interval comprises at least one subframe.

3. The apparatus of claim 1, wherein the pre-determined guard interval immediately follows the transmission-time interval in which the PDCCH signaling is received.

4. The apparatus of claim 1, wherein the change of configuration comprises a change in the number of component carriers to be used for data transmission, or a change to a set of active component carriers with the number of active component carriers remaining the same.

5. The apparatus of claim 1, wherein the processor is further configured to delay an automatic-repeat-request process corresponding to the apparatus by a number of transmission-time intervals equal to the pre-determined guard interval.

6. The apparatus of claim 1, wherein the processor is further configured to determine that an outgoing data transmission is scheduled for the guard interval and to defer the data transmission until after the pre-determined guard interval.

7. The apparatus of claim 6, wherein deferring the data transmission until after the pre-determined guard interval comprises performing a HARQ retransmission of the outgoing data transmission.

8. The apparatus of claim 1, wherein the PDCCH signaling is a fast basis signal.

9. The apparatus of claim 1, wherein the first data is indicative of a determination by an eNodeB that a component-carrier-configuration change is needed.

10. A method, comprising:
receiving, by a wireless mobile station, using a first component-carrier configuration, first data, the first data comprising Physical Downlink Control Channel (PDCCH) signaling;
determining, by the wireless mobile station, that the PDCCH signaling indicates that a change of configuration to a second component-carrier configuration is pending;
in response to the determination that the PDCCH signaling indicates that the change of configuration to the second component-carrier configuration is pending, selectively activate, de-activate, or reconfigure one or more components comprised by the wireless mobile station, such that the wireless mobile station is reconfigured to the second component-carrier configuration within a pre-determined guard interval of at least one transmission-time interval; and
receive, by the wireless mobile station, second data according to the second component-carrier configuration, after the guard interval.

11. The method of claim 10, wherein the pre-determined guard interval comprises at least one subframe.

12. The method of claim 10, wherein the pre-determined guard interval immediately follows the transmission-time interval in which the PDCCH signaling is received.

13. The method of claim 10, wherein the change of configuration comprises a change in the number of component carriers to be used for data transmission, or a change to a set of active component carriers with the number of active component carriers remaining the same.

14. The method of claim 10, further comprising the wireless mobile station delaying an automatic-repeat-request process corresponding to the wireless mobile station by a number of transmission-time intervals equal to the pre-determined guard interval.

15. The method of claim 10, further comprising:
determining, by the wireless mobile station, that an outgoing data transmission is scheduled for the guard interval; and
deferring the data transmission until after the pre-determined guard interval.

16. The method of claim 15, wherein deferring the data transmission until after the pre-determined guard interval comprises performing a HARQ retransmission of the outgoing data transmission.

17. The method of claim 10, wherein the PDCCH signaling is a fast basis signal.

18. A method comprising:
determining, by a base station, that a change of configuration from a first component-carrier configuration to a second component-carrier configuration is needed;
transmitting, by the base station to a mobile station, using a first component-carrier configuration, first data, the first data comprising Physical Downlink Control Channel (PDCCH) signaling, the PDCCH signaling being indicative that a change of configuration to the second component-carrier configuration is pending;
in response to the determination that a change of configuration from the first component-carrier configuration to the second component-carrier configuration is needed, refraining from transmitting by the base station, data to the mobile station, during a pre-determined guard interval of at least one transmission-time interval subsequent to the transmission of the first data;
selectively, by base station, activating, de-activating, or reconfiguring one or more components comprised by the base station, such that the base station is reconfigured to the second component-carrier configuration within the pre-determined guard interval; and
transmitting, by the base station, second data to the mobile station according to the second component-carrier configuration, after the guard interval.

19. The method of claim 18, wherein the pre-determined guard interval comprises at least one subframe.

20. The method of claim 18, wherein the pre-determined guard interval immediately follows the transmission-time interval in which the change of configuration is signaled.

21. A base station comprising:
processor circuitry configured to
make a determination that a change of configuration from a first component-carrier configuration to a second component-carrier configuration is needed;
in response to the determination that a change of configuration from the first component-carrier configuration to the second component-carrier configuration is needed, generate first data, the first data comprising Physical Downlink Control Channel (PDCCH) signaling, the PDCCH signaling being indicative that a change of configuration to the second component-carrier configuration is pending;
selectively activate, de-activate, or reconfigure one or more components comprised by the base station, such that the base station is reconfigured to the second component-carrier configuration within a pre-determined guard interval of at least one transmission-time interval subsequent to transmission of the first data; and
a transmitter configured to:
transmit the first data to the mobile station;
refrain from transmitting data to the mobile station during the pre-determined guard interval;
transmit second data to the mobile station according to the second component-carrier configuration, after the guard interval.

22. The method of claim 18, wherein the pre-determined guard interval comprises at least one subframe.

23. The method of claim 18, wherein the pre-determined guard interval immediately follows the transmission-time interval in which the change of configuration is signaled.

* * * * *